(12) United States Patent
Bucourt et al.

(10) Patent No.: US 6,653,613 B1
(45) Date of Patent: *Nov. 25, 2003

(54) METHOD AND DEVICE FOR WAVEFRONT OPTICAL ANALYSIS

(75) Inventors: Samuel Bucourt, Bures sur Yvette (FR); Xavier Levecq, Gif sur Yvette (FR)

(73) Assignee: Imagine Optic, Orsay (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/509,211
(22) PCT Filed: Sep. 24, 1998
(86) PCT No.: PCT/FR98/02055
§ 371 (c)(1), (2), (4) Date: Mar. 24, 2000
(87) PCT Pub. No.: WO99/15867
PCT Pub. Date: Apr. 1, 1999

(30) Foreign Application Priority Data

Sep. 24, 1997 (FR) .............................................. 97 11870

(51) Int. Cl.$^7$ ................................................. G01J 1/20
(52) U.S. Cl. ..................................... 250/201.9; 356/121
(58) Field of Search ......................... 250/201.9; 356/121

(56) References Cited

U.S. PATENT DOCUMENTS

| | | | |
|---|---|---|---|
| 4,712,913 A | * 12/1987 | Bareket | ....................... 356/121 |
| 4,737,621 A | 4/1988 | Gonsiorowski et al. | |
| 5,233,174 A | 8/1993 | Zmek | |
| 5,300,766 A | * 4/1994 | Granger et al. | .......... 250/201.9 |
| 5,493,391 A | 2/1996 | Neal et al. | |

OTHER PUBLICATIONS

W.H. Southwell, "Wave–front estimation from wave–front slope measurements," J. Opt. Soc. Am., vol. 70, No. 8, Aug. 1980, pp. 998–1006.
E.P. Wallner, "Comparison of wavefront sensor configurations using optimal reconstruction and correction," XP002051451, Itek Optical Systems, pp. 42–53.
R. Cubalchini, "Modal wave–front estimation from phase derivative measurements," J. Opt. Soc. Am., vol. 69, No. 7, Jul. 1979, pp. 972–977.

* cited by examiner

Primary Examiner—Stephone B. Allen
Assistant Examiner—Eric Spears
(74) Attorney, Agent, or Firm—Young & Thompson

(57) ABSTRACT

A method and device for measuring optical wavefront shape parameters based on line-by-line analysis of the wavefront are disclosed. The method comprises at least one step ($ACQ_i$) consisting of acquiring a wavefront line. The acquisition comprises detecting ($DET_i$) the line for delivering an electric signal characterizing it, for example, by means of a detection module including, in particular, an array of microlenses and a sensor, the module capable of being mobile in rotation and/or in translation. The acquisition comprises a step ($Ts_i$) for processing the signal for determining a set $K_i$ of parameters, for example, values proportional to the wavefront phase values measured on the line. In an embodiment, the method further comprises a step ($REC_i$) for reconstructing each wave line consisting, for example, in expressing the line phase on a base of orthogonal polynomials, then a step ($REC_s$) for reconstructing the wavefront on the basis of the reconstructed lines. The method and apparatus are applicable in laboratories and industry, for example, for characterizing optical components or systems.

14 Claims, 7 Drawing Sheets

METHOD AND DEVICE FOR WAVEFRONT OPTICAL ANALYSIS

BACKGROUND OF THE INVENTION

1. Field of the Invention

The method and device according to the invention relate to optical wave surface analysis, that is to say the measurement of shape parameters of the surface of a wavefront, or wave surface, for ultraviolet, visible or infrared wavelengths. The wave surface is the cartography of the phase of the wavefront.

The shape parameters can, for example, be curvature, tilt or standard geometrical aberrations: spherical aberration, astigmatism, coma, etc. . . More generally, the phase $\Phi$ of the incident wavefront in an optical system can be broken down on a basis of orthogonal polynomials $P_i$ over the format formed by the pupil of the optical system:

$$\Phi = \Sigma a_i P_i$$

The measurement of shape parameters then involves the determination of the coefficients $a_i$. Hereafter, the support constituted by the pupil of the optical system will be referred to as the "wavefront support".

2. Description of the Relate Art

Different types of device are known for carrying out wave surface analysis. Interferometric devices for example determine the wave surface on the basis of the interference pattern between a reference wavefront and the wavefront to be studied. Detection of the interference pattern is carried out directly using a two-dimensional array of detectors (typically 512×512 elementary detectors or "pixels") which allows a high spatial resolution and a very fine analysis of the wave surface. However, this method uses a large amount of signal processing because of the quantity of data to be managed and because of this requires a long measurement time which is difficult to make compatible with real time measurements. Interferometric devices are furthermore complex to use and have operational constraints due to the physical mechanism on which they are based: small measurement dynamic, operation using monochromatic light, difficulty in analysing the wavefront from dioptric systems, impossibility of analysing a wavefront coming directly from a source such as a laser diode for example.

Wavefront analysers of the Shack-Hartmann type do not have these constraints. Their use is standard for example in adaptive optics for correcting in real time phase disturbances introduced by turbulence in the propagation of optical beams (ONERA French patent FR A-2665955). Other documents describe devices based on the Shack-Hartmann array technology (see for example the patents U.S. Pat. No. 4,737,621 and U.S. Pat. No. 5,233,174). The principle of the Shack-Hartmann analyser consists in sampling the optical wavefront using a two-dimensional array of optical systems, conventionally spherical microlenses, the array being conjugate with the entrance pupil of the optical system. Each microlens defines a sub-pupil and gives an image of the object. The local slopes of the wave are determined by the relative displacement of the focal spot with respect to a reference position corresponding to a plane wave, coming from an object at infinity. The wave surface is reconstructed by integration of the local slope measurements. The mathematical principle of this reconstruction is described for example in the article by SOUTHWELL W. H. ("Wave-front estimation from wave-front slope measurements", JOSA Vol. 70 n°8 pp 988–1006) for estimating the phase of a circular support wavefront on the basis of local slope measurements. In order to measure the displacements, an array of CCD type detectors is placed at the focus of the microlenses. The production of this type of analyser leads to a simple, compact and totally achromatic optical instrument.

However, a major disadvantage of devices of the Shack-Hartmann type is due to their poor spatial resolution. In fact, in order to minimise the measurement error on the average slope of the wavefront over a sub-pupil, proportional to the displacement of the image spot at the focus of the corresponding microlens, it is necessary that the measurement of this displacement be carried out using a sufficient number of pixels of the array of detectors. Conventionally, about 15×15 pixels are associated with one sub-pupil. Thus, the number of sub-pupils is limited by the size of the array of detectors. The error in the reconstruction of the wavefront due to the spatial sampling of the latter becomes greater as the number of sub-pupils becomes smaller; on the one hand because of the filtering effect of high spatial frequencies of the phase of the wavefront, and on the other hand because of the poor geometrical cover of the optical wavefront with the array of sub-pupils. The patent U.S. Pat. No. 5,493,391 proposes a one-dimensional wavefront distortion sensor for studying fluid mechanical phenomena with a very good spatial and temporal resolution, but it does not make it possible to determine the shape parameters of the whole surface of the wavefront.

Other types of wave surface analysers are known; for example, curvature analysers or bilateral or trilateral shift analysers. The physical principles of the means of detection used in all these devices differ, but all use a wave surface analysis process based on an overall treatment of the latter: the detection means comprise arrays of two-dimensional detectors making it possible to detect the whole of the wave surface to be analysed. This method has two major disadvantages:

Even if a specific application requires only the measurement of certain shape parameters, the amount of processing of this data will not be less nor will the measurement time be shorter.

This method is linked to the use of arrays of detectors and on the technology appropriate for it, giving rise in particular to limits in the size of the useful analysis zone. This explains why the majority of the known wave surface analysers require the use of shaping optics in order to adapt the diameter of the wavefront to the field of the analysis device. Furthermore, this gives rise to a limitation of the spatial resolution and of the measurement accuracy in particular in devices of the Shack-Hartmann type.

SUMMARY OF THE INVENTION

The present invention departs from the conventional method of wave surface analysis based on the acquisition of the whole of the wavefront and proposes a method for analysing the surface of the wavefront based on a line-by-line acquisition of the wavefront and a method of measuring shape parameters which is adapted to this.

More precisely, the invention relates to a method for measuring a given number of shape parameters of the surface of an optical wavefront of given support, the shape parameters being the coefficients of a break-down of the phase of the wavefront on a base of orthogonal polynomials over said format, characterised in that it comprises:

the acquisition of at least two separate lines of the wavefront comprising, for each wave line, the optical detection of said line delivering an electrical signal characterising it, and the processing of said signal making it possible to determine a set of parameters proportional to the values of the phase of the wavefront, or of an $n^{th}$ derivative of said phase, measured on said line, the calculation, from the sets corresponding to the said wave lines, of said shape parameters.

Advantageously, the calculation step comprises a step for reconstructing each wave line consisting, for example, in expressing the phase of each wave line on a base of orthogonal polynomials, then a step of reconstruction of the wave surface from the reconstructed lines.

The invention also relates to a device for measuring shape parameters of the surface of a wavefront which uses the method according to the invention.

The device according to the invention advantageously comprises, for the detection of a wave line, a detection module comprising, in particular, a set of optical systems disposed linearly and a strip of detectors. Strips of detectors are easier to produce than the equivalent two-dimensional detector arrays and, for the same cost, thus have a larger size. Consequently, the spatial resolution can be improved in comparison with that obtained by array wavefront analysers of the Shack-Hartmann type. The device according to the invention furthermore makes it possible, in most cases, to dispense with shaping optics which are generally necessary in the wavefront analysers of the prior art in order to adapt the diameter of the wavefront to the field of the analysis system.

The device according to the invention also has the advantage of being modular and adaptable. In fact, the number of wavefront lines to be acquired depends on the number and nature of the shape parameters required to be measured. Thus the calculating capacity and the measuring time are adapted to each application.

BRIEF DESCRIPTION OF THE DRAWINGS

Other advantages and characteristics of the invention will appear more clearly on reading the following description, illustrated by the appended drawings, which show.

DESCRIPTION OF THE PREFERRED EMBODIMENTS

In the following description, the same references refer to the same elements.

Figure 1:
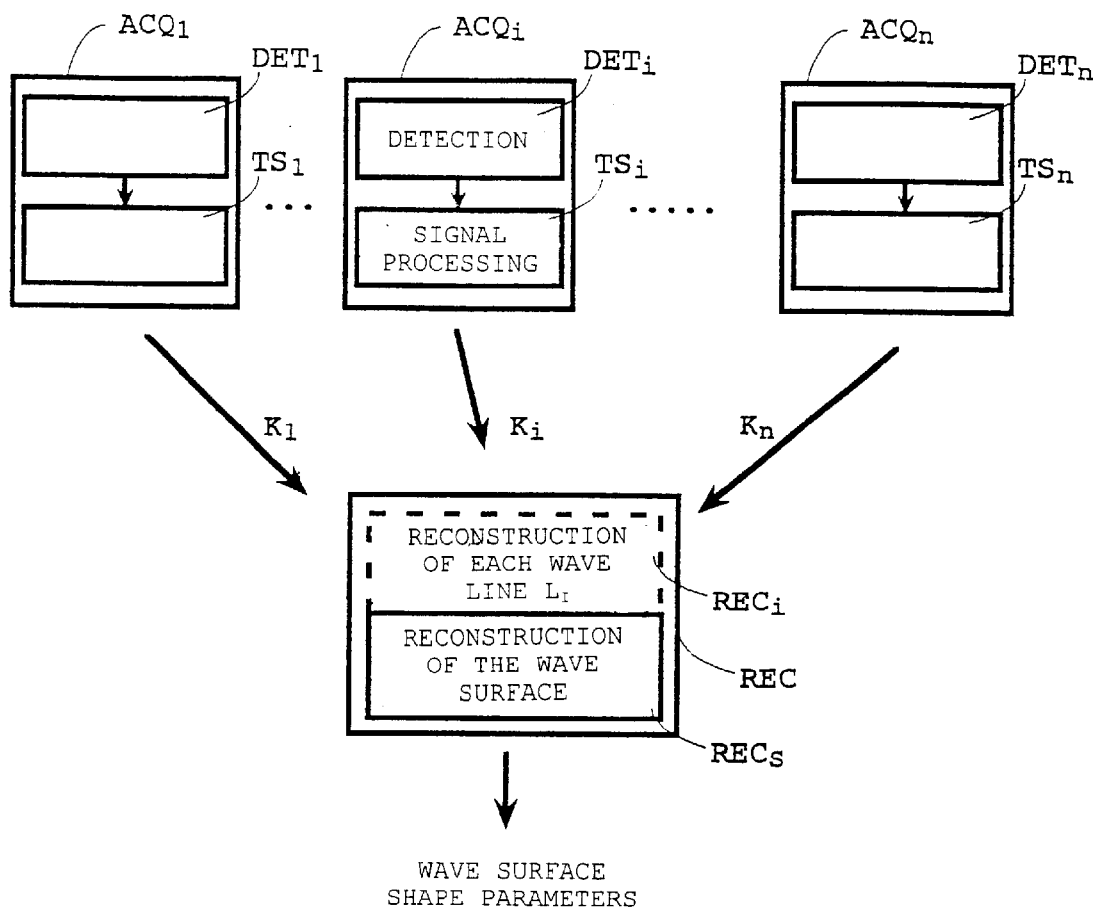
in FIG. 1, the principal steps of the method according to the invention, in FIG. 2, an example of the acquisition of 4 wave lines, in FIG. 3A, an embodiment of a device according to the invention, in FIG. 3B, an element of the device described in FIG. 3A, in FIG. 4, another example of a device according to the invention, in FIGS. 5A and 5B, two-dimensional array and line-by-line sampling of a circular wavefront, in FIG. 6, a diagram showing the principle of detection of a wave line, in FIG. 7, the expression of a matrix used in the reconstruction of the wave surface, in FIGS. 8A and 8B, diagrams showing, according to an example, the result of a reconstruction method used in the method according to the invention.

FIG. 1 illustrates the method according to the invention. The n acquisition steps $ACQ_i$, $n \geq i \geq 1$, allow the acquisition of n wave lines. The term "wave line" or "wavefront line" refers to a section along a line of the wavefront. Each acquisition step $ACQ_i$ consists in a first detection step $DET_i$ of the wave line by appropriate optical means, these means delivering an electrical signal characterising the wave line, then in a second step $TS_i$ of processing the electrical signal making it possible to determine a set $K_i$ of characteristic parameters $k_{ij}$ of the phase of the wave line; the phase of the wave line is a set of values of the phase of the wavefront measured along the said line. The parameters $k_{ij}$ are for example values proportional to those of the phase of the wavefront or of a derivative of the phase, measured on the line. The n detection and signal-processing steps can be carried out either in series or in parallel, which makes it possible to optimise the implementation of the method at speed. In order to increase the accuracy of measurement, it is possible to carry out several acquisition steps on a single wave line and to derive an average, either during the detection step or during the signal processing step.

The reconstruction step REC makes it possible to reconstruct the wave surface, that is to say to calculate the shape parameters of the latter, from the sets $K_i$ of parameters $k_{ij}$ corresponding to the acquired wave lines $L_i$. The parameters $k_{ij}$ are for example values proportional to the values of the phase or of an $n^{th}$ derivative of the phase measured on the line, as described below. Advantageously, the reconstruction comprises a step of reconstruction of each wave line, consisting for example in expressing the phase of each wave line on a base of orthogonal polynomials, then a step of reconstruction of the wave surface from the reconstructed lines. Examples of reconstruction used in the method are given below.

Figure 2:
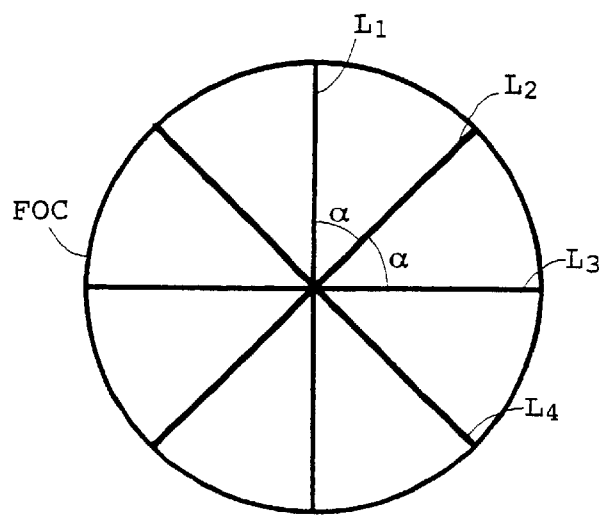

The number and nature of the shape parameters that can be obtained depend on the number of acquisitions of separate lines. Consider for example the case of a circular support wavefront. The phase of this wavefront is conventionally broken down on the basis of Zernike polynomials, a set of orthogonal functions over a circular support of radius 1. These functions have the advantage of being widely used by opticians since they give the known geometrical aberrations. The acquisition of two perpendicular wave lines, secant at their centres, gives 21 of the first 36 Zernike polynomials (the most conventionally used), the acquisition of four wave lines concurrent at their centres and forming an angle of 45° between each other give 32 of the first 36 polynomials and the acquisition of eight wave lines concurrent at their centres and forming an angle of 22.5° between each other gives the first 64 Zernike polynomials. By way of example, FIG. 2 shows a circular wavefront FOC, analysed by the method according to the invention in which there is carried out the acquisition of 4 separate wave lines $L_1$, $L_2$, $L_3$ and $L_4$, concurrent at their centres and forming an angle α of 45° between each other. These examples show how the method according to the invention can be varied; it is adapted to the sought shape parameters; thus the calculating power and the measuring time are adapted to each application.

Figure 3A:
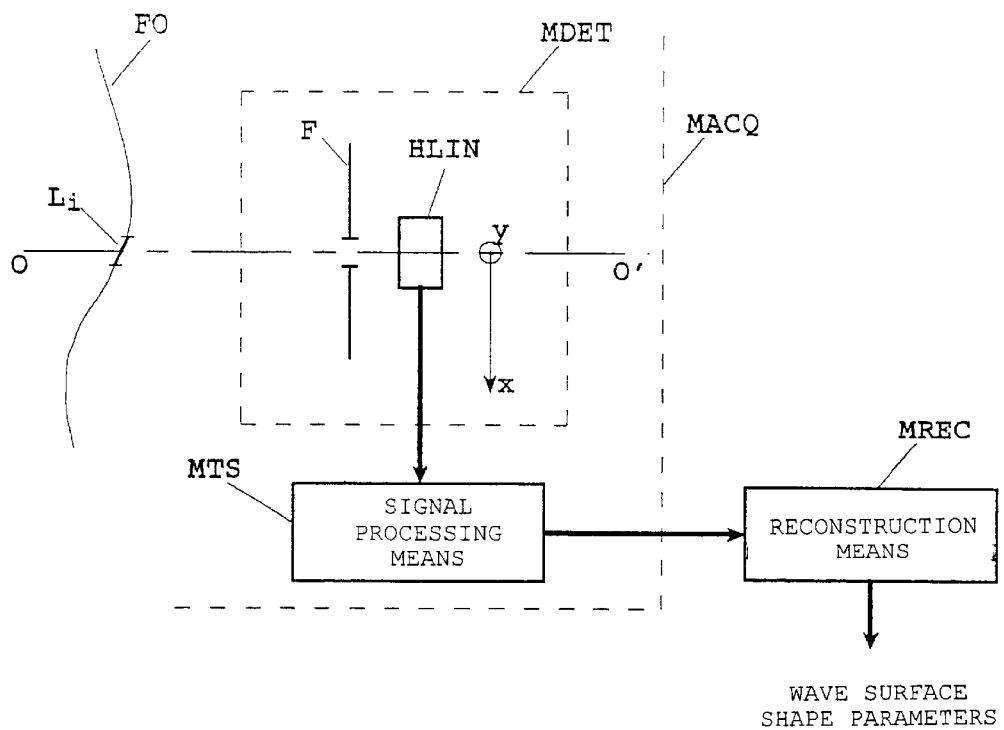
Figure 3B:
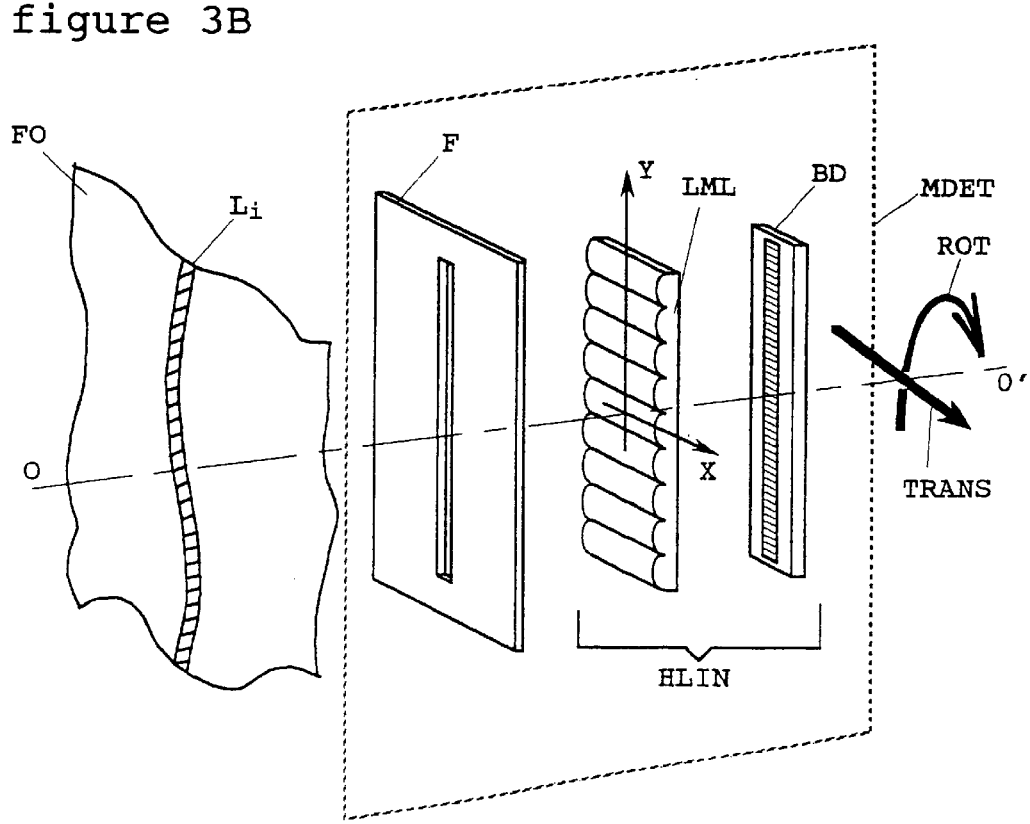

The described method can be used with the device according to the invention. FIGS. 3A and 3B illustrate an embodiment of this device.

An incident wavefront FO in the device is considered. The wavefront has come from a coherent or an incoherent source, emitting at a wavelength chosen by the operator; it can even be polychromatic: in this case, the device analyses an average wavefront. The device shown in FIG. 3A comprises means MACQ for acquiring one or more lines of the wavefront making it possible to determine, for each acquired wave line $L_i$, a set $K_i$ of parameters $k_{ij}$ characteristic of the derivative of the phase of the line or of the phase itself and means of reconstruction MREC of the wave surface.

The acquisition means MACQ comprise detection means MDET centred on an axis OO'. In the example shown in FIG. 3A, the detection means comprise a slot F and a detection module HLIN. The slot F allows a pre-selection of the zone in which is situated the wave line $L_i$ which it is wished to detect. It makes it possible to limit parasitic illuminations by limiting the aperture of the system. According to one example, the detection module HLIN consists of a line of optical systems and a detector positioned in a plane close to the focal plane of the optical systems. Each optical system constitutes a sub-pupil. The optical systems can be lenses or microlenses. The shape of these lenses or microlenses can for example be spherical, aspherical or cylindrical. The detector can for example be a strip of detectors, that is to say a detector comprising a set of elementary detectors (or pixels) arranged along a line or along several lines, thus having a length at least 10 times greater than its width; it is, for example, a CCD strip or a strip of photodiodes. The slot and the detection module are oriented along a y axis perpendicular to the axis OO'.

FIG. 3B describes more accurately detection means MD comprising a slot F and a module HLIN consisting of a line LML of cylindrical microlenses whose generatrices are parallel with the x axis, the x axis being perpendicular to the OO' axes and y, and a strip of BD detectors of the CCD strip type. The line LML can typically consist of 100 touching microlenses, of 10 mm focal length, of length about 10 mm along the generatrix (x axis) and about 300 microns in the other direction (y axis). The detectors strip is constituted for example of 2048 square pixels of side 14 microns, aligned along the y axis over a length of 28.7 mm.

In this example, the dimensions and the orientation of the detected wave line are limited by those of the detectors strip: the greater dimension of the detected wave line is the length of the strip of detectors (in the y direction), that is to say 28.7 mm, and its smaller dimension is the width of the strip of detectors (along x), that is to say 14 microns. It should be noted that in the case of a line of spherical microlenses, the smallest dimension of the wave line would be given by the size along the x axis of the spherical microlenses, that is to say typically 300 microns.

One of the advantages of the use of cylindrical microlenses in the device described in this example can thus be appreciated. Another advantage is the fact that if the incident wavefront exhibits a tilt along x, the detection will not be disturbed since, along this axis, the cylindrical microlenses are equivalent to flats with flat and parallel faces. On the other hand, if spherical microlenses are used, detection will be possible only if the tilt is less than the apparent angle at which the detector is viewed in its width.

The detection means of FIG. 3B also comprise means of rotating about the OO' axis of the assembly constituted by the slot F and the detection module HLIN, or means of translating this assembly along the x axis, or a combination of both. These means, not shown in FIG. 3B, are symbolised by arrows marked ROT and TRANS. They make it possible to acquire several wave lines for a fine analysis of the wave surface. It is necessary that each of the acquired wave lines be secant to at least one other wave line; this makes it possible in effect to establish a phase origin. It should be noted that the rotation of the detection module can introduce a tilt of the module, even very slight, which can generate errors in the analysis of the wavefront. It will be explained below how the method according to the invention makes it possible to overcome tilts introduced by rotation.

Figure 4:
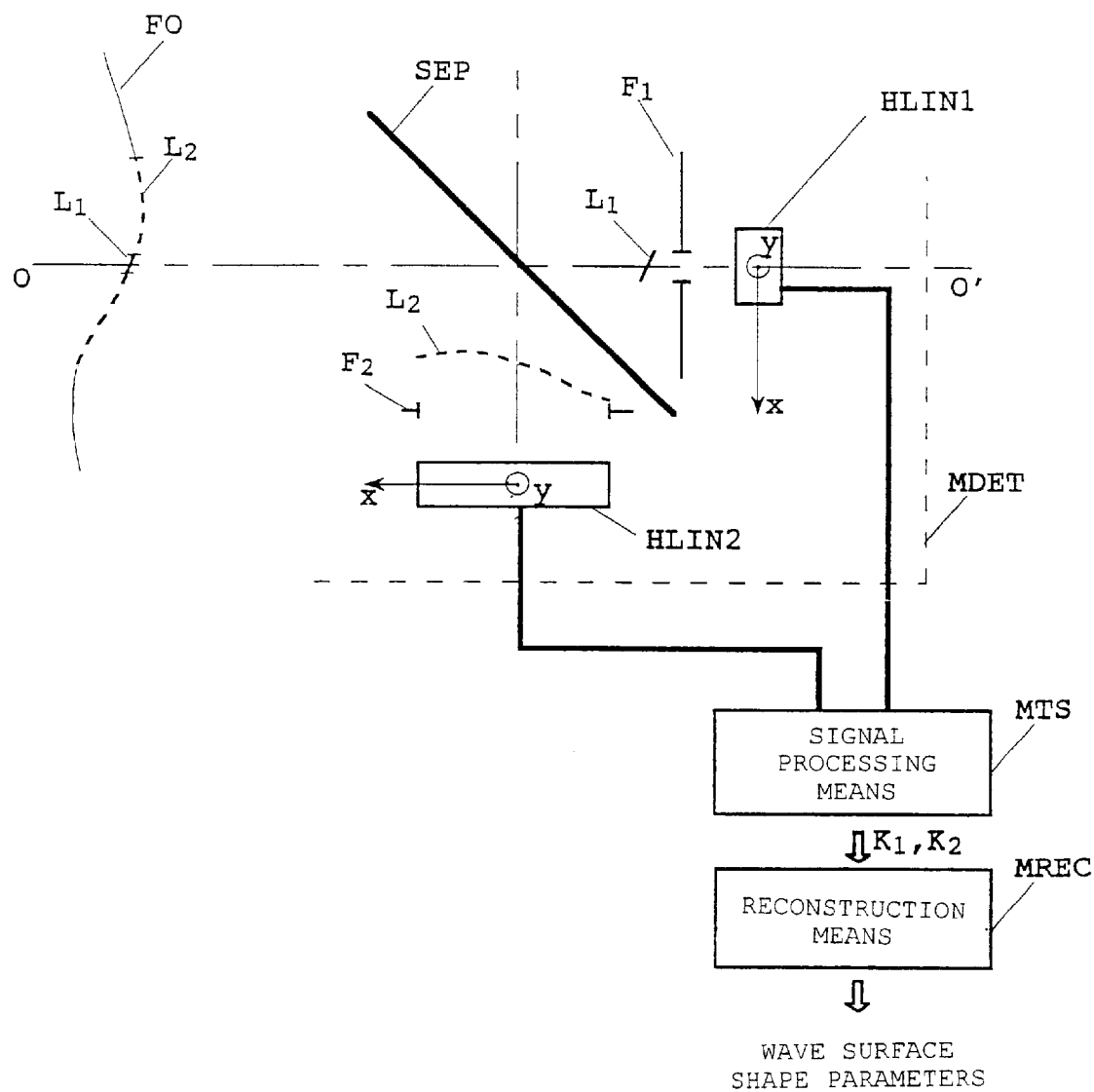

Another method of acquiring several wave lines is illustrated by means of another embodiment of the device according to the invention shown diagrammatically in FIG. 4. Two detection modules $HLIN_1$ and $HLIN_2$ are disposed on a same platform and separated by a beam separator element SEP such as, for example, a separating flat. They make it possible to detect simultaneously two orthogonal wave lines $L_1$ and $L_2$ of the wavefront FO. The signal processing means MTS process the two electrical signals in order to obtain a sampling of the two profiles of the derivative of the phase at the FO. This particular implementation allows the acquisition of wave lines two-by-two rather than one-by-one as in the devices described in FIGS. 3A and 3B. Means of rotation and/or of translation can also be installed in order to displace one or other or both of the detection modules.

Figure 5A:
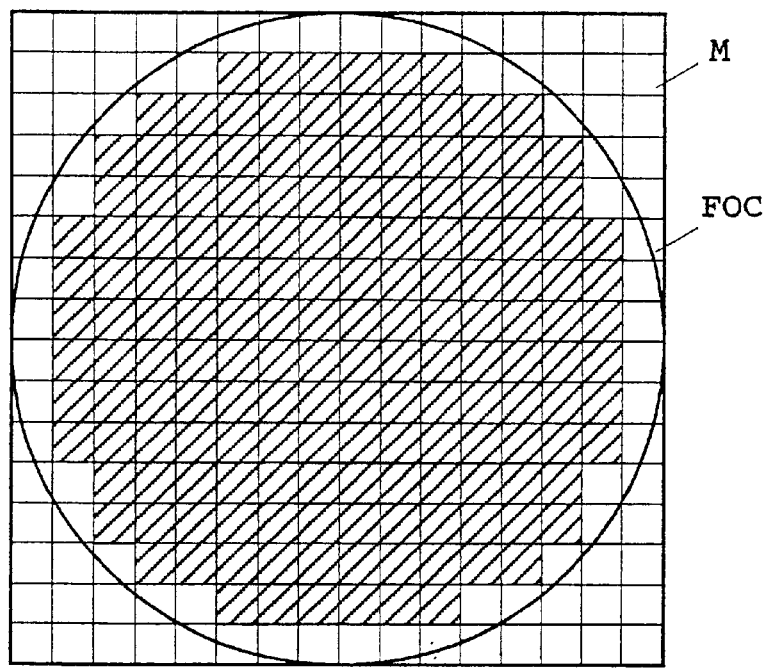
Figure 5B:
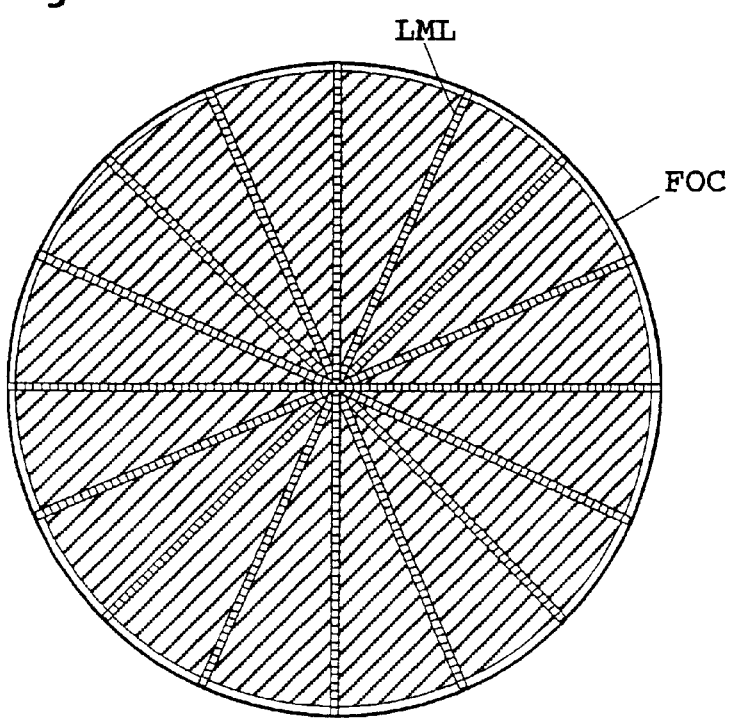

FIGS. 5A and 5B illustrate by an example how the device according to the invention described for example in FIGS. 3A, 3B and 4 makes it possible to increase the measurement accuracy in comparison with a Shack-Hartmann array analyser of the prior art. FIG. 5A shows array type sampling of a circular wavefront FOC. There is considered, for example, an array M of 16×16 sub-pupils, which have square cross-sections, illuminated by the wavefront FOC. This configuration is standard in the existing devices and corresponds for example to the use of a 512×512 pixel detector with a square analysis field of side approximately 5 mm. The diameter of the wavefront FOC, for example equal to 30 mm, has been adapted to the size of the array by shaping optics. FIG. 5A shows that more than a quarter of the illuminated sub-pupils are only partially illuminated (the fully illuminated sub-pupils are shown cross-hatched), introducing an error during the reconstruction of the wave surface and therefore an uncertainty which can be significant in the determination of the shape parameters. FIG. 5B illustrates the analysis of a wavefront by a device of the type described in FIGS. 3A and 3B implementing the method according to the invention. The circular wavefront FOC of FIG. 5A is again considered but no shaping optics are used. The line-by-line detection of the wavefront is done for example by means of a detection module such as is described in FIG. 3A. The dimension of the analysis field is about 29 mm. FIG. 5B shows the very small number of partially illuminated sub-pupils in comparison with the number of fully illuminated sub-pupils (cross-hatched). The error in the reconstruction due to the poor geometric overlap is therefore minimised. In practice, it will be possible systematically to dispense with the measurements given by the microlenses placed at the ends of the line LML. In this way the geometric overlap error is eliminated and the measurement accuracy remains good because the number of sub-pupils remains large.

Figure 6:
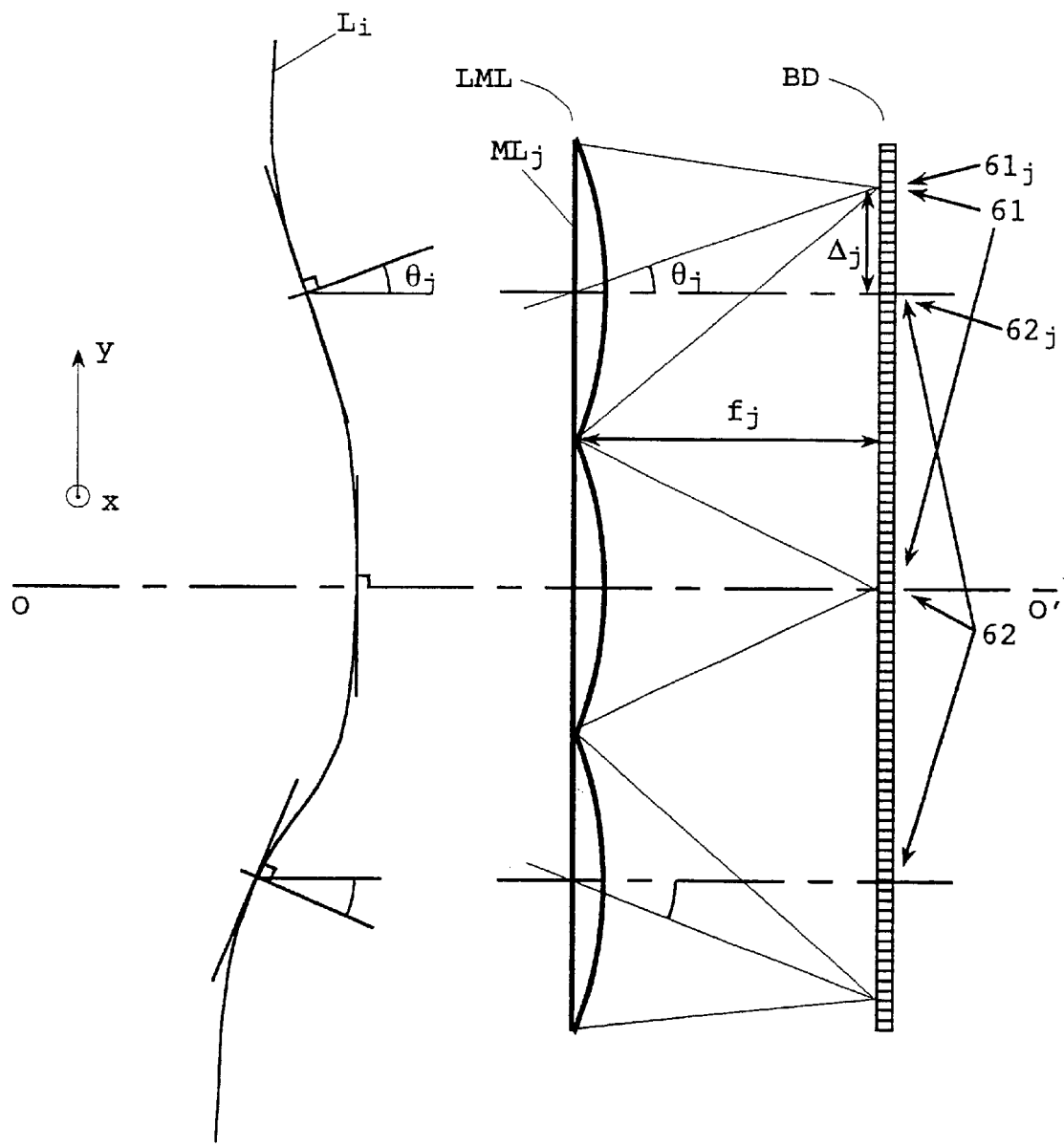

The acquisition of a wave line $L_i$ according to a variant will be described below. The detection means are for example of the type of those described in FIG. 3B. The assembly constituted by the slot and the detection module is oriented along the y axis. The physical principle making it possible to determine the set $K_i$ of parameters $k_{ij}$ using the detection means described above is illustrated in FIG. 6. It is a standard method for determining the local slope of the wavefront, similar to that used in Shack-Hartmann array analysers. This method is recalled simply by showing just a few microlenses. FIG. 6 shows a cross-section of the detection module HLIN of FIG. 3B in a plane defined by the OO' and y axes. Only 3 microlenses of the line LML of microlenses are shown. The portion of flux collected by each microlens $ML_j$ is focussed into a light spot $61_j$ on the detector strip BD. All of the light spots 61 are therefore obtained. The electrical signal characterising the line $L_i$ delivered by the detection means described in this example corresponds to the profile of the light spots 61.

The signal processing step here consists in determining the local slope of the phase at the level of each microlens. The spot $61_j$ is characterised for example by its barycentre. The set 62 of the "focal points on the axis" $62_j$, representing the light spots obtained when the examined wavefront is perfectly flat and parallel with the line of microlenses LML and also characterised by their barycentre, is also defined. The distance separating the position of the barycentre of the spots $61_j$ from that of the barycentre of the focal point on the corresponding axis $62_j$ is proportional to the local slope $\tan(\theta_j)$ of the wave line at the level of the microlens $ML_j$ in question. $\tan(\theta_j)$ is the local slope along the axis of the line MLM of microlenses since, in the considered example, the microlenses are cylindrical. If $\Delta_j$ is this distance and $f_j$ the distance between the microlens $ML_j$ and the detector BD, the local slope $\tan(\theta_j)$ is equal to:

$$\tan(\theta_j)=\Delta_j/f_j$$

The local slope $\tan(\theta_j)$ corresponds to the mean value $\Phi'_{ij}$ of the derivative of the phase of the wave line $L_i$ at the level of the sub-pupil $Sp_j$ defined by the microlens $ML_j$. In this case, the set $K_i$ consists of $\Phi'_{ij}$ values.

According to a preferred variant, the wave surface reconstruction step can be broken down into a step $REC_i$ (see FIG. 1) of reconstruction of each wave line $L_i$ consisting for example in determining the profile $\Phi_i$ of the phase of said line, and then a step $REC_s$ of reconstruction of the proper wave surface from the reconstructed lines.

Consider firstly the reconstruction of a wave line $L_1$. From the values $\Phi'_{ij}$ determined for example according to the previously described acquisition step, the method according to the invention consists, for example, in the reconstruction of the profile of the derivative of the phase or the profile of the phase itself of the wave line $L_1$. This reconstruction can be carried out using a polynomial formalism. In the method according to the invention, there is used for example the base of Legendre polynomials $\{Leg_i\}$ which are orthogonal along a line in order to express the phase of the wave line. The phase profile $\Phi_1$ of the wave line $L_1$ is then described by:

$$\Phi_1=\Sigma v_{1i}\, Leg_i$$

The reconstruction vector $v_1=(v_{1l}, \ldots, v_{1i}, \ldots, v_{1p})$ consisting of the coefficients affecting the Legendre polynomials $Leg_i$ then forms a set of parameters making it possible to express the phase of the wave line $L_1$. The size of this vector is equal to the number p of first Legendre polynomials chosen in this case in order to make the reconstruction. The number p can be chosen according to the number of sub-pupils of the detection module (the value of p cannot exceed the number of sub-pupils), according to the sought shape parameters, according to the calculating time available, etc. In concrete terms, the vector $V_1$ is for example the result of the matrix multiplication of a determination matrix [MD] by the column vector $\Phi'_1=\{\Phi'_{1,l},\ldots,\Phi'_{1,j},\ldots,\Phi'_{1,nml}\}$, where nml is the number of sub-pupils illuminated by the wavefront to be analysed. In this example, the determination matrix, consisting of p lines and mnl columns, is the inverse of an interaction matrix [MI] which is determined as follows:

$$[MI]_{i,j}=\Phi'_{i,lxLegj}$$

where $\Phi'_{i,lxLegj}$ is the mean value of the derivative of the phase at the level of the sub-pupil $SP_i$ of a wavefront whose expression is given by the $j^{th}$ Legendre polynomial to which a coefficient 1 is assigned.

The determination of the profile of the phase of a single wave line already makes it possible to determine certain of the shape parameters of the wave surface which are the parameters of revolution symmetry shapes (curvature, spherical aberration, . . . ). This also makes it possible to know the projection of the aberrations on the axis of the detected wave line (tilt along this axis, projection of the coma, etc.).

Consider now the acquisition of n separate wave lines $L_i$. Each wave line is reconstructed, for example according to the previously described method, n sets $V_i$ are obtained, each corresponding to the reconstruction of the wave line $L_i$ and making it possible to express the phase of the line $L_i$.

The reconstruction $REC_s$ of the wave surface can then be done using a method derived from the zonal method described in the prior art and making it possible to reconstruct, zone by zone, the cartography of the phase of the wavefront from the reconstructed lines. This method is particularly well suited to wavefronts having singularity points. The disadvantage of such a method however in the method according to the invention is that it necessitates the acquisition of numerous wave lines; the acquisition and calculating means to be deployed are therefore large as is the time necessary for the analysis of the wavefront.

Advantageously, the reconstruction $REC_s$ of the wave surface of the method according to the invention is a polynomial reconstruction, based on a decomposition of the phase $\Phi$ of the wavefront on a basis of orthogonal polynomials on the support of this wavefront. In order to describe these reconstruction means, there shall firstly be taken as an example the particular case of a circular support wavefront. The phase $\Phi$ can then be broken down on the basis of a number m of Zernike polynomials $Z_i$. The acquisition of n separate wave lines ($n\geq 2$) shall be assumed. All of these lines are substantially concurrent at their centres and make an angle between each other of $\pi/n$. The wave lines are reconstructed on a base of p Legendre polynomials. It is sought to progress from the information on line ($V_i$ vectors) to the reconstruction of the wave surface, that is to say to the parameters $a_i$ defined by:

$$\Phi=\Sigma a_i Z_i$$

Figure 7:
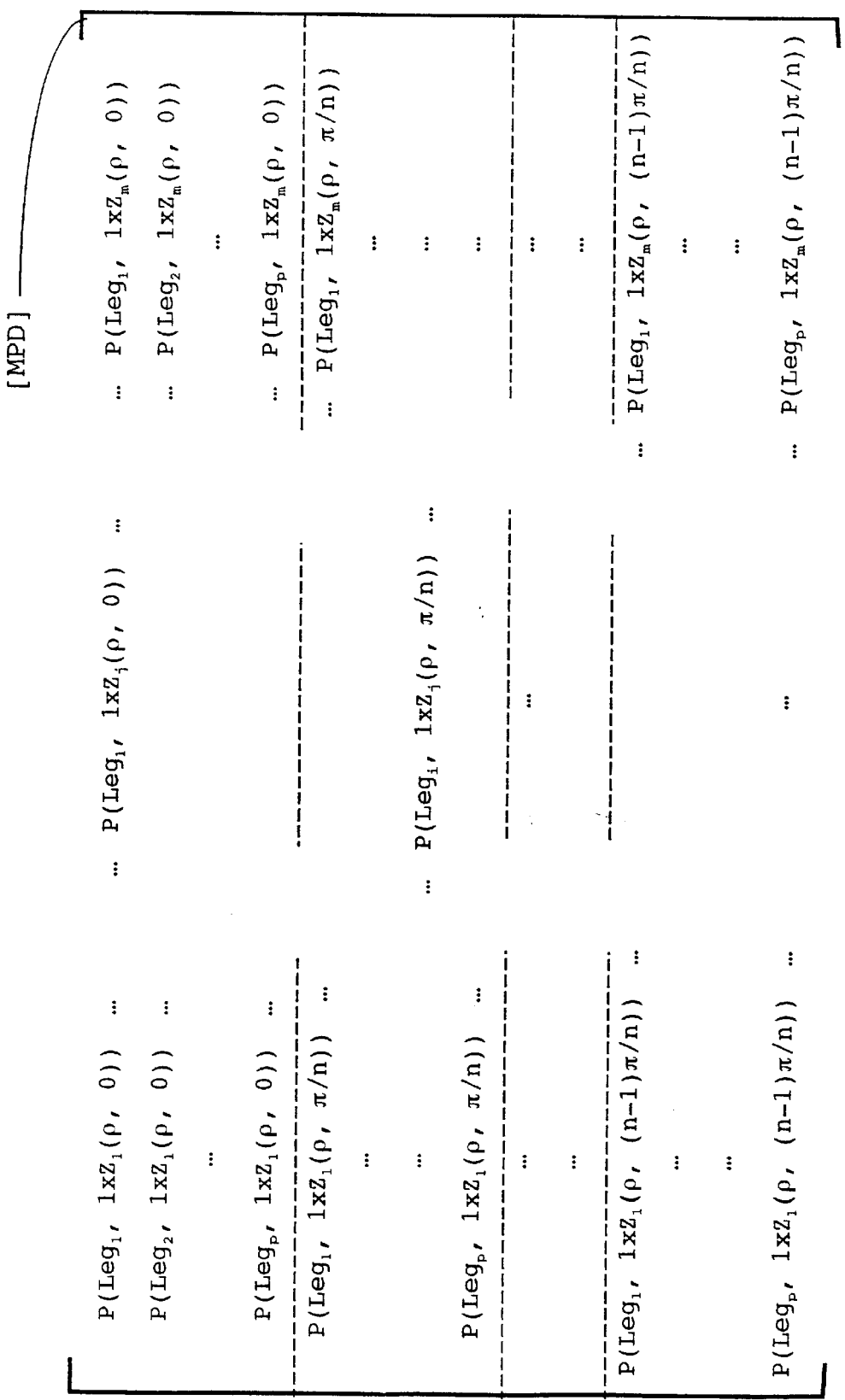

In order to do this, there is defined, for example, a matrix [MP] called a projection matrix whose expression is obtained from a projection of the first p Legendre polynomials on the m Zernike polynomials chosen for reconstructing the wave surface. For example, this matrix [MP] can be obtained by inverting a direct projection matrix [MPD] whose expression is given in FIG. 7. In this figure, each term $P(Leg_i\, 1\times Z_j(\rho, (n-k)\pi/n))$ represents a scalar product of the $i^{th}$ Legendre polynomial ($1\leq i\leq p$) with the $j^{th}$ Zernike polynomial provided with a coefficient 1, ($1\leq j\leq m$), expressed in polar co-ordinates ($\rho,\theta$), this polynomial being taken as $\theta_k=k\pi/n$ where k is an integer, k assuming the values ($\theta_0=0$) to ($n-1$) ($\theta_n-1=(n-1)\pi/n$).

The matrix [MPD] thus comprises n×p lines (n×p corresponding to the product of the number n of previously reconstructed lines and the size p of the vector $V_i$ characterising a wave line $L_i$) and m columns (m corresponding to the number of parameters $a_i$ to be calculated). Each column j comprises the values of the scalar product between each Legendre polynomial $Leg_i$ ($1\leq i\leq p$) and the $j^{th}$ Zernike polynomial $Z_j$ ($\rho, \theta_k$), $\theta_k$ successively assuming the n values corresponding to the angles of the n previously reconstructed wave lines. This scalar product must retain the property of orthogonality of the Zernike polynomials over the format defined by the geometry of the n wave lines.

The projection matrix [MP] is therefore multiplied by the vector formed by all of the elements of the reconstruction vectors $V_i$ and therefore comprising n×p elements. For example, in order to calculate the first 36 Zernike polynomials using a detection module comprising 100 cylindrical microlenses and after a series of eight acquisitions, it will be necessary to define a matrix MP of size 36×80 (the use of the first ten Legendre polynomials may be sufficient, hence p=10).

When it is desired to acquire more than two wave lines, it may be necessary to rotate the detection modules mechanically by one wave line. It is therefore necessary to be able to escape possible tilting introduced by the rotation flat. The method according to the invention makes it possible to escape these tiltings. Take the case of a circular support wavefront and the reconstruction of this wavefront on a base of Zernike polynomials such as described above. The expression of the Zernike polynomials in polar co-ordinates $(\rho,\theta)$ reveals that in all of the polynomials, the tilt terms (in $\rho$) are always of azimuthal order equal to 1, that is to say they vary in $\rho\cos\theta$ or $\rho\sin\theta$. It is therefore possible, from any wavefront broken down into Zernike polynomials, to determine the coefficients of the two tilt polynomials ($2^{nd}$ and $3^{rd}$ Zernike polynomials respectively in $\rho\cos\theta$ and $\rho\sin\theta$) which totally cancel out any terms in $\rho\cos\theta$ and $\rho\sin\theta$ in the wavefront. All the other coefficients remain unchanged. In a variant of the method according to the invention, in order to overcome possible errors due to tilting of the wavefront introduced by mechanical operations intended to acquire several wave lines, the reconstruction REC furthermore comprises a step consisting, during the reconstruction $REC_i$ of each wave line, in cancelling the effect of the polynomial $\rho$ in the expression of the phase of the reconstructed line. During the reconstruction $REC_s$ of the wave surface, it is thus possible to determine the exact coefficients, not modified by possible errors due to tilting of the wavefront, of the Zernike polynomials chosen for the decomposition (except for the coefficients of the tilt polynomials). The values of the two coefficients totally cancelling out all terms in $\rho\cos\theta$ and $\rho\sin\theta$ in the wavefront are given by the reconstruction $REC_s$. The initial tilts of the wavefront can however be determined from the two wave lines acquired at 0° and at 90°.

Figure 8A:
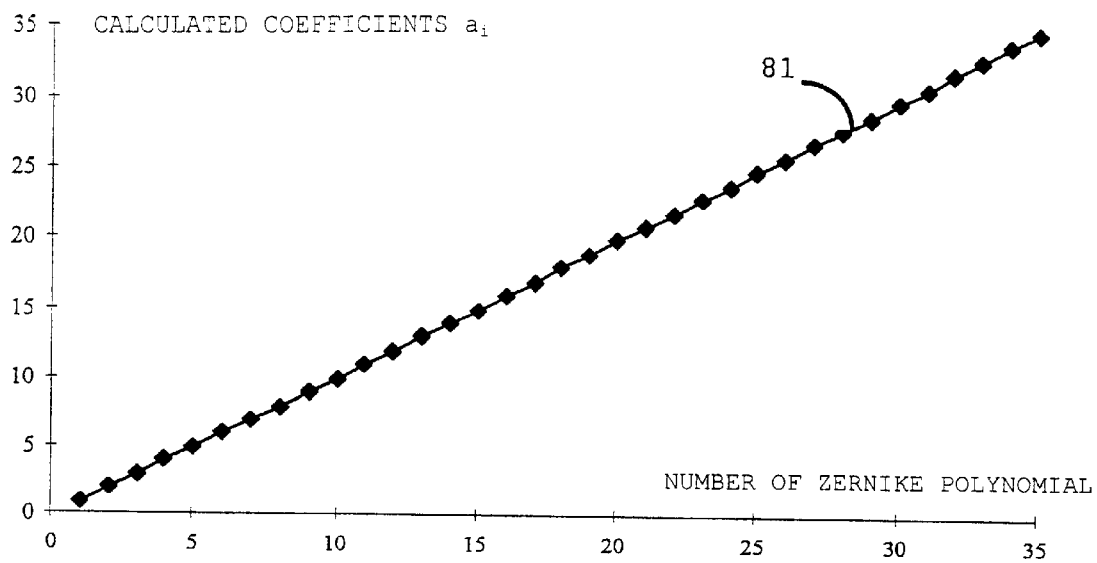
Figure 8B:
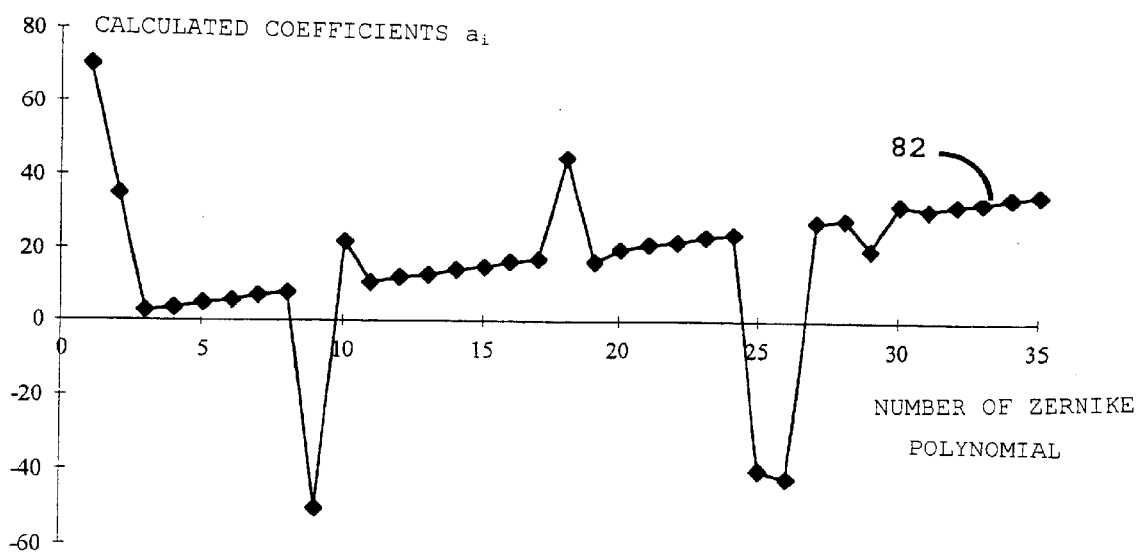

FIGS. 8A and 8B illustrate by an example the result of a reconstruction step used in the method according to the invention, such as described above. In this example, a circular support wavefront, incident in the analyser according to the invention is simulated, this wavefront breaking down on the base of the first 36 Zernike polynomials and being defined by 36 coefficients $a_i$ modifying these polynomials. In this example, the coefficient $a_i$ is taken as equal to i ($a_i$=1$a_2$=2, etc.). These values do not correspond to a real wavefront but make it possible to illustrate clearly the result obtained. It is assumed that the method according to the invention comprises the acquisition of 8 concurrent wave lines, two consecutive lines forming an angle of 22.5° between each other. The acquisition is, in this example, obtained by rotation of a wave line detection module, and for each wave line, the translation flat introduces a given tilt. The response given by the analyser according to the invention is simulated on each of the 8 wave lines, taking account of the shape of the wavefront and of the tilts introduced by the flat, then the wavefront reconstruction step as described above is applied. FIG. 8A gives, as a function of the number of Zernike polynomials over which the decomposition is carried out, the value of the coefficient calculated by the method according to the invention applying, during the reconstruction, the step making it possible to escape tilts such as described above. The curve 81 obtained shows that, for each Zernike polynomial, the original coefficient which was applied to it is fully found. FIG. 8B shows a curve 82 obtained by the same reconstruction but without the tilt correction step. In this case, wave surface reconstruction errors are clearly visible. This example thus shows an additional characteristic of the method according to the invention allowing a line-by-line analysis of the surface of a wavefront.

The analysis method according to the invention is of course not limited to a circular support wavefront. In the case of a rectangular support wavefront for example, a polynomial reconstruction can also be made. Let it be assumed for example, that (n+1) wave lines have been acquired, n wave lines being strictly parallel and the last one secant to all the others, for example at right angles. The reconstruction can be carried out on a principle similar to that described before but this time the m polynomials to be considered may be chosen from the basis of Legendre polynomials (two dimensions) or that of Tchebycheff polynomials.

The devices according to the invention are intended for multiple laboratory or industrial applications. They provide an operator with quantitative help when the latter is carrying out experimental optical adjustments. It allows the characterisation of components or of optical systems at the wavelength chosen by the operator (or possibly in polychromatic light: the device then analyses the average wavefront). The particular configuration with two devices placed at 90° to each other makes it possible to extract the great majority of the Zernike polynomials of azimuthal order less than or equal to two (with folding up the other polynomials). These polynomials correspond among other things to the most standard aberrations: tilts, defocusing, spherical aberration, coma, astigmatism (0°).

Finally, this device allows the analysis of elements as diverse as phase flats, holograms (transmission or reflection), liquid crystal screens etc.

What is claimed is:

1. Method for measuring a given number (m) of shape parameters ($a_i$) of a surface of an optical wavefront of given support, the shape parameters being the coefficients of a break-down of the phase ($\Phi$) of the wavefront on a base of orthogonal polynomials ($P_i$) on said support, characterised in that it comprises:
    incidence on linear detection means of at least two spatially separate lines belonging to said incident wavefront surface, said at least two lines having an intersection point belonging to the wavefront surface to establish the origin of the phase of said wavefront surface,
    acquisition of said at least two incident wave lines (Li) comprising for each said incident wave line (Li):
        optical detection comprising the collection of linear portions of said line by a linear array of optical systems, the focusing by each optical system of one of said linear portions into a light spot, and the optical detection of the light spot positions by linear detector means delivering an electrical signal characterising said incident wave line;
        the processing (TS) of said electrical signal to determine a set $K_i$ of parameters $k_{ij}$ proportional to the values of the phase of the wavefront, or of an nth derivative of said phase,
    the reconstruction (REC) of said wavefront surface comprising the calculation of the said shape parameters ($a_i$)

of the wavefront surface from the sets $K_i$ determined for each said at least two incident wave lines (Li).

2. Method according to claim 1, characterised in that the calculation step (REC) comprises, for each wave line ($L_i$), a step ($REC_i$) of reconstruction of said line, consisting in expressing on the basis of the set $K_i$, the phase or an $n^{th}$ derivative of the phase, on a basis of orthogonal polynomials on said line, then in calculating said shape parameters ($a_i$) from the reconstructed lines.

3. Method according to claim 2, characterised in that the calculation of the shape parameters is done using a zonal method, making it possible to reconstruct zone by zone the cartography of the phase of the wavefront from the reconstructed wave lines.

4. Method according to claim 2, characterised in that for each wave line ($L_i$), the reconstruction ($REC_i$) of the line ($L_i$) consists in expressing the phase ($\Phi_i$) of said wave line as a function of a predetermined number p of Legendre polynomials thus giving for each wave line ($L_i$) a reconstruction vector ($V_i$) consisting of coefficients assigned to said Legendre polynomials.

5. Method according to claim 3, characterised in that, the support of the wavefront being circular and a predetermined number n of separate wave lines being reconstructed, said lines being substantially concurrent at their centres and forming an angle of $\pi/n$ between each other, the polynomial base ($P_i$) on which the phase ($\Phi$) of the wavefront is broken down is a base consisting of a predetermined number m, corresponding to the number of sought shape parameters, of orthogonal Zernike polynomials and the calculation of said shape parameters ($a_i$) is obtained by the multiplication of the vector formed by all of the elements of the reconstruction vectors ($V_i$) of the n wave lines, by a projection matrix ([MP]) an expression of which is obtained from a projection of the p Legendre polynomials onto the m Zernike polynomials.

6. Method according to claim 5, characterised in that, the Zernike polynomials being expressed in polar co-ordinates ($\rho,\theta$), the step (REC) of calculation of the shape parameters ($a_i$) furthermore comprises a step consisting, during each reconstruction ($REC_i$) of a wave line ($L_i$) in cancelling out the effect of the polynomial $\rho$, which totally cancels out all terms in $\rho\cos\theta$ and in $\rho\sin\theta$ in the expression of the wavefront, this step making it possible to escape any errors due to the tilt of the wavefront that are introduced by mechanical operations aimed at acquiring several wave lines.

7. Method according to claim 3, characterised in that, the support of the wavefront being rectangular, (n+1) separate wave lines being reconstructed, where n is greater than or equal to 2, n lines being strictly parallel with each other and the last one secant to all the others, the base of polynomials ($P_i$) on which the wavefront phase is broken down is a base consisting of a predetermined number m, corresponding to the number of sought shape parameters, of two-dimensional orthogonal Legendre polynomials, and the calculation of the shape parameters ($a_i$) is obtained by the multiplication of the vector formed by all of the elements of the reconstruction vectors ($V_i$) of the n wave lines, by a projection matrix an expression of which is obtained from a projection of the p Legendre polynomials onto the m two-dimensional Legendre polynomials.

8. Device for measuring shape parameters ($a_i$) of an optical wavefront surface, characterised in that it comprises
means (MACQ) of acquisition of at least two spatially separate lines belonging to said wave front surface, each wave line corresponding to a line incident on linear optical detection means, said at least two lines having an intersection point belonging to the wavefront surface to establish the origin of the phase of said wavefront surface, said acquisition means comprising:
optical detection means comprising a linear array of optical systems for the collection of linear portions of said incident wave lines and for the focusing of the linear portions into light spots and means for the optical detection of the light spot positions delivering for each of said at least two lines an electrical signal characterising the incident light wave; and
signal-processing means (MTS) making it possible to determine a set $K_i$ of characteristic parameters $k_{ij}$ proportional to the values of the phase of said wavefront surface, or of an $n_{th}$ derivative of said phase, measured on each of said at least two lines ($L_i$),
reconstruction means (MREC) for calculating said shape parameters ($a_i$) from the sets ($K_i$) corresponding to said wave lines so as to reconstruct said wavefront surface from said shape parameter.

9. Device according to claim 8, characterised in that the detection means (MDET) comprise at least one module (HLIN) for detecting at least one line of said at least two wave lines comprising a set of optical systems disposed linearly and a detector, each optical system collecting a portion of said one line and focusing it into a light spot on the detector, the position of said spot making it possible to determine the local slope of the phase of said one line at the level of the optical system in question.

10. Device according to claim 9, characterized in that the set of optical systems is a line (LML) of cylindrical microlenses.

11. Device according to claim 9, characterised in that the detection means (MDET) furthermore comprise means for rotating the module (HLIN), the at least two wave lines being detected in series by said module.

12. Device according to claim 9, characterised in that the detection means (MDET) furthermore comprise means for translating the detection module (HLIN).

13. Device according to claim 8, characterised in that the wave line detection means (MDET) furthermore comprise a slit (F) integral with the detection module (HLIN), making it possible to pre-select the zone of the wavefront (FO) containing said line.

14. Device according to claim 8, characterised in that the detection means (MDET) comprise 2 detection modules ($HLIN_1$, $HLIN_2$), perpendicular to one another, and a separating plate (SEP) positioned such that one of the modules ($HLIN_1$) detects one wave line ($L_1$) and the other module ($HLIN_2$) detects another wave line ($L_2$) perpendicular to the first one.

* * * * *